(12) United States Patent
Sato et al.

(10) Patent No.: US 11,198,343 B2
(45) Date of Patent: Dec. 14, 2021

(54) AMPHIBIOUS VEHICLE

(71) Applicant: MITSUBISHI HEAVY INDUSTRIES, LTD., Tokyo (JP)

(72) Inventors: Shinichi Sato, Tokyo (JP); Tetsuya Miyamoto, Tokyo (JP); Takashi Matsunaga, Tokyo (JP); Katsuhiko Nakajo, Tokyo (JP); Taichi Omura, Tokyo (JP); Yuta Shimizu, Tokyo (JP); Takenori Kawana, Tokyo (JP); Takashi Mizumoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 70 days.

(21) Appl. No.: 16/624,520

(22) PCT Filed: Dec. 22, 2017

(86) PCT No.: PCT/JP2017/046061
§ 371 (c)(1),
(2) Date: Dec. 19, 2019

(87) PCT Pub. No.: WO2019/003473
PCT Pub. Date: Jan. 3, 2019

(65) Prior Publication Data
US 2020/0223269 A1 Jul. 16, 2020

(30) Foreign Application Priority Data
Jun. 30, 2017 (JP) .............................. JP2017-128195

(51) Int. Cl.
*B60F 3/00* (2006.01)
(52) U.S. Cl.
CPC .................................. *B60F 3/0046* (2013.01)

(58) Field of Classification Search
CPC ........ B60F 3/00; B60F 3/0038; B60F 3/0046; B63B 19/08
See application file for complete search history.

(56) References Cited

U.S. PATENT DOCUMENTS

| 5,765,497 A | 6/1998 | Thomas et al. |
| 10,106,004 B2 * | 10/2018 | Oshima ................... B63B 1/286 |

(Continued)

FOREIGN PATENT DOCUMENTS

| JP | 3-45489 A | 2/1991 |
| JP | 2015-127182 A | 7/2015 |

OTHER PUBLICATIONS

International Search Report for International Application No. PCT/JP2017/046061, dated Mar. 20, 2018, with English translation.

(Continued)

*Primary Examiner* — Stephen P Avila
(74) *Attorney, Agent, or Firm* — Birch, Stewart, Kolasch & Birch, LLP (57) ABSTRACT

To enlarge a collapsible flap and store the collapsible flap appropriately. In an amphibious vehicle (1) in which a flap (13) which receives lift from water in water navigation is provided to be deployable and storable at a front side in a travel direction of a vehicle body (11), the flap (13) includes a lower flap (21) which is stored to come close to a front surface (11a) of the vehicle body (11) and an upper flap (22) which is stored to come close to an upper surface (11b) of the vehicle body (11), and at least one of the lower flap (21) and the upper flap (22) includes a first flap member (31) and a second flap member (32) and is configured such that a flap length ($L_{13}$) in a direction orthogonal to a vehicle width direction is variable.

2 Claims, 7 Drawing Sheets

(56) References Cited

U.S. PATENT DOCUMENTS

2010/0170430 A1\* 7/2010 Gros ................. B63B 27/143
 114/362
2017/0158010 A1 6/2017 Oshima

OTHER PUBLICATIONS

Written Opinion of the International Searching Authority for International Application No. PCT/JP2017/046061, dated Mar. 20, 2018, with English translation.

\* cited by examiner

AMPHIBIOUS VEHICLE

TECHNICAL FIELD

The present invention relates to an amphibious vehicle.

BACKGROUND ART

An amphibious vehicle capable of moving on water and land is used as a water rescue vehicle or a disaster countermeasures vehicle, and for such amphibious vehicles, rapidly arriving at a destination is required. Accordingly, by providing a flap to the amphibious vehicle for example, a moving speed in water navigation is increased, which reduces a moving time to the destination (a moving time in water navigation.)

Here, the flap is a plate-like member for easily receiving lift from water in water navigation of the amphibious vehicle, and this is provided to be inclined upward in a vertical direction at a front side in a travel direction of the amphibious vehicle and has a surface (a flap surface) in which an angle contacting to a water surface (a contact angle) is set to be small. The amphibious vehicle provided with the flap can navigate water moving from a floating state with a deep draft to a sliding state with a shallow draft in water navigation, so that the moving speed in water navigation is increased.

As the flap, there exists a collapsible flap provided to be deployable and storable to a front side in a travel direction of a vehicle body. An amphibious vehicle applying the collapsible flap can navigate in the sliding state in water navigation by deploying the flap to be separated from the vehicle body by a driving mechanism, while it can move avoiding contact between the flap and a stepped portion etc. in land driving by storing the flap to come close to the vehicle body by the driving mechanism (for example, see PTL 1.)

CITATION LIST

Patent Literature

[PTL 1]
Japanese Unexamined Patent Application, Publication No. 2015-127182

SUMMARY OF INVENTION

Technical Problem

In an amphibious vehicle applying such collapsible flap, when further reduction of the moving time in water navigation is required, by enlarging the collapsible flap, lift from water in water navigation can be received more easily, which achieves efficient moving from the floating state to the sliding state.

However, in an amphibious vehicle in which a driving seat is provided to protrude from an upper surface of a vehicle body etc., a space for storing a collapsible flap is limited, and the collapsible flap may not be appropriately stored. In other words, when the enlarged collapsible flap during storage interferes with the driving seat etc., the flap of the amphibious vehicle cannot be enlarged.

The present invention is made in view of the above problem, and an object of the present invention is to enlarge the flap and store the flap appropriately.

Solution to Problem

In order to solve above problem, according to a first invention, there is provided an amphibious vehicle in which a flap that receives lift from water in water navigation is provided to be deployable and storable at a front side in a travel direction of a vehicle body, wherein the flap includes a lower flap which is stored to come close to a front surface of the vehicle body and an upper flap which is stored to come close to an upper surface of the vehicle body, and at least one of the lower flap and the upper flap includes a first flap member and a second flap member and is configured such that a flap length in a direction orthogonal to a vehicle width direction is variable.

In order to solve above problem, according to a second invention, there is provided the amphibious vehicle according to the first invention, wherein the first flap member and the second flap member are connected to be slidable with respect to each other, and the flap is configured such that the flap length is variable by a sliding operation of the first flap member and the second flap member.

In order to solve above problem, according to a third invention, there is provided the amphibious vehicle according to the first invention, wherein the first flap member and the second flap member are connected to be rotatable with respect to each other, and the flap is configured such that the flap length is variable by a rotating operation of the first flap member and the second flap member.

In order to solve above problem, according to a fourth invention, there is provided the amphibious vehicle according to any one of the first invention to the third invention, further including: a driving unit which deploys and stores the flap; a navigation state detecting unit which can detect a navigation state in moving on water; and a control unit which controls driving of the driving unit based on a detection result of the navigation state detecting unit.

In order to solve above problem, according to a fifth invention, there is provided the amphibious vehicle according to the fourth invention, wherein the control unit operates the driving unit such that the flap length is longer when the navigation state detecting unit detects that the navigation state is a floating state, and the control unit operates the driving unit such that the flap length is shorter when the navigation state detecting unit detects that the navigation state is a sliding state.

Advantageous Effects of Invention

According to the amphibious vehicle according to the first invention, the flap can be enlarged and appropriately stored. Also, since lift can be increased in water navigation of the amphibious vehicle due to enlargement of the flap, the amphibious vehicle can reach a sliding region effectively, and further, since resistance can be smaller in water navigation of the amphibious vehicle by setting a contact angle of the enlarged flap and a water surface (a draft line) to be smaller, the amphibious vehicle can reach a sliding region more effectively.

According to the amphibious vehicle according to the second invention, the flap which can be enlarged and appropriately stored has a simple configuration.

According to the amphibious vehicle according to the third invention, the flap which can be enlarged and appropriately stored has a simple configuration.

According to the amphibious vehicle according to the fourth invention, the flap can be deployed and stored appropriately in accordance with a navigation state (a floating state, a sliding state etc.) of the amphibious vehicle.

According to the amphibious vehicle according to the fifth invention, in a case where the navigation state of the amphibious vehicle is the floating state or the sliding state, the flap can be deployed and stored appropriately to execute effective navigation on water.

DESCRIPTION OF EMBODIMENTS

Hereinafter, examples of an amphibious vehicle according to the present invention will be explained in detail with reference to attached drawings. Of course, the present invention is not limited to the following examples, and various modifications can be executed in the scope not departing from the gist of the present invention.

First Example

A structure of an amphibious vehicle according to a first example of the present invention will be explained with reference to FIGS. 1 to 5.

Figure 1:
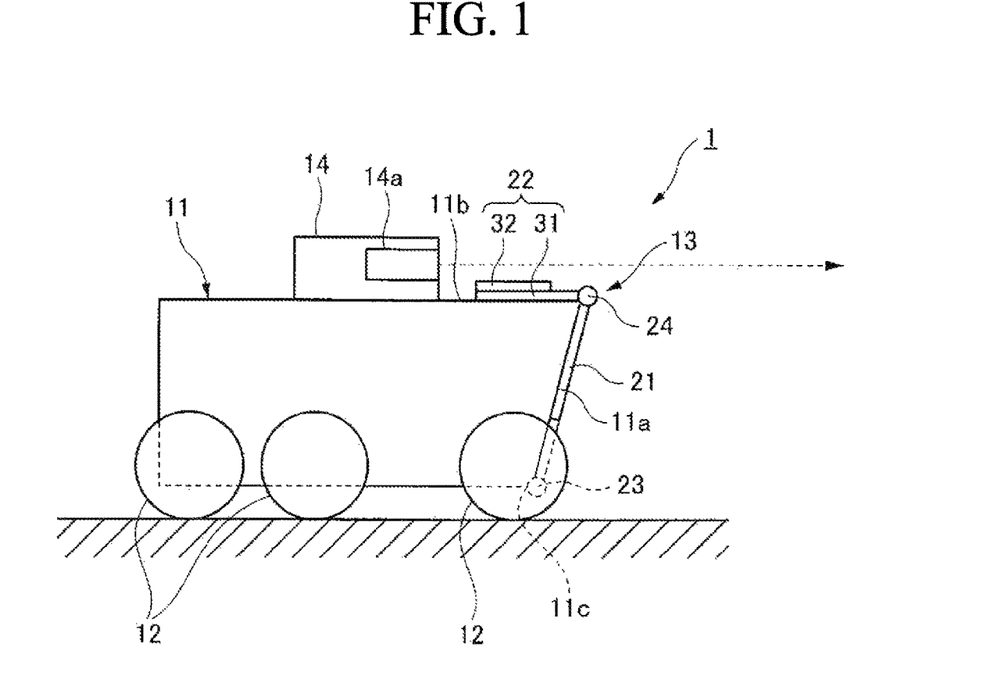
FIG. 1 is an explanation view showing a structure of an amphibious vehicle (in land driving) according to a first example.

As shown in FIG. 1, an amphibious vehicle 1 includes a wheel (or a track) 12 below a vehicle body 11, and the amphibious vehicle can move on land when the wheel 12 is driven by a not shown driving source. Also, the amphibious vehicle 1 includes a not shown propeller, and it can navigate water by driving this propeller by a not shown driving source (see FIG. 2.) In other words, the amphibious vehicle 1 can move on water and land.

Figure 2:
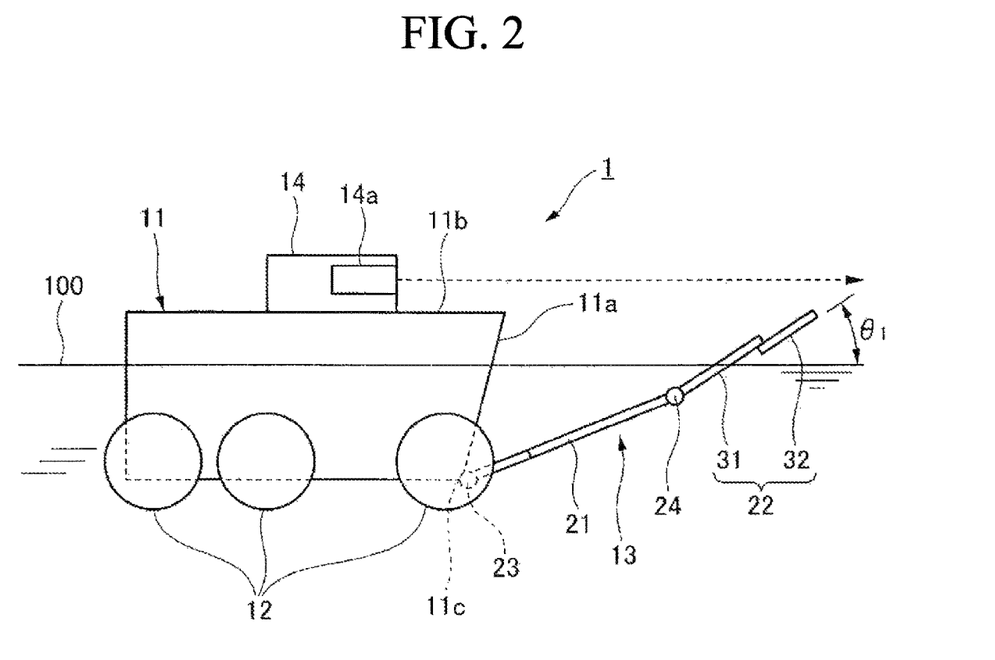
FIG. 2 is an explanation view showing a structure of the amphibious vehicle (a floating state in water navigation) according to the first example.

As shown in FIG. 2, to the amphibious vehicle 1, a flap (a plate-like member) 13 for easily receiving lift from water in water navigation is provided at a front side in a travel direction of the vehicle body 11 (a right side in FIG. 2.) Thus, the amphibious vehicle 1, by receiving lift from water by the flap 13 in water navigation, changes its navigation state from a floating state with a deep draft to a sliding state with a shallow draft to navigate water.

As shown in FIGS. 1 and 2, the flap 13 can be deployed and stored to the vehicle body 11 (a collapsible flap), and is schematically constituted by a lower flap 21 to be stored to come close to (come into contact with) a front surface 11a of the vehicle body 11 and an upper flap 22 to be stored to come close to (come into contact with) an upper surface 11b of the vehicle body 11.

Figure 4:
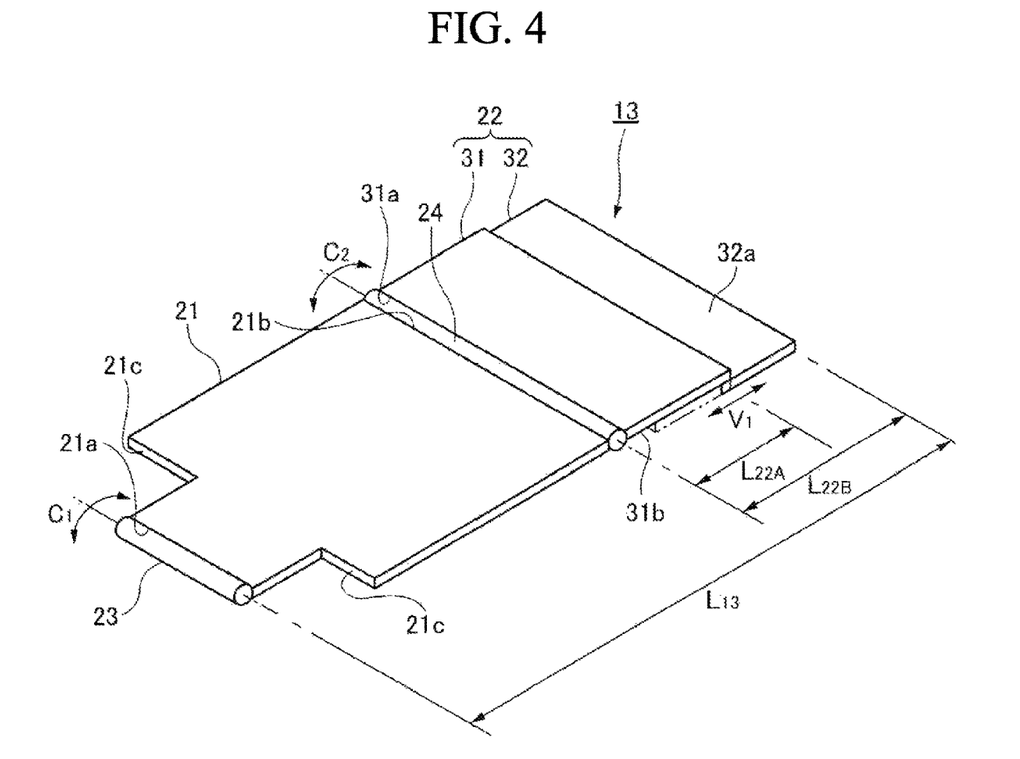
FIG. 4 is an explanation view showing a structure of a flap provided to the amphibious vehicle according to the first example.

As shown in FIGS. 1, 2 and 4, the lower flap 21 is a plate-like member which is substantially T-letter-shaped and whose lower end 21a having a narrow width is connected to a lower end 11c of the vehicle body 11 at the front side in the travel direction via a hinge 23. Also, the lower flap 21 is mechanically connected to a first flap driving unit 41 (see FIG. 5) for a rotating operation of the lower flap 21 to the vehicle body 11 to be rotated about a rotation axis $C_1$ extending in a vehicle width direction to the vehicle body 11.

As shown in FIG. 4, the upper flap 22 is substantially constituted by a first upper flap 31 and a second upper flap 32 which are slidable with respect to each other, and is configured such that a flap length (a length in a direction that the flap (the upper flap 22) extends orthogonally to the vehicle width direction) is variable by a sliding operation of the first upper flap 31 and the second upper flap 32.

The first upper flap 31 is a plate-like member which is substantially rectangular-shaped and whose lower end 31a is connected to an upper end 21b having a broad width in the lower flap 21 via a hinge 24. Also, the first upper flap 31 is mechanically connected to a second flap driving unit 42 (see FIG. 5) for a rotating operation of the first upper flap 31 to the lower flap 21 to be rotated about a rotation axis $C_2$ extending in the vehicle width direction to the lower flap 21.

The second upper flap 32 is a plate-like member which is substantially rectangular-shaped and whose rear surface 32a contacts to a front surface 31b of the first upper flap 31 to be slidably connected to the first upper flap 31. Also, the second upper flap 32 is mechanically connected to a third flap driving unit 43 (see FIG. 5) for a sliding operation of the second upper flap 32 to the first upper flap 31 to be slid in an axial direction V1 (a direction that the upper flap 22 (the first upper flap 31 and the second upper flap 32) extends orthogonally to the vehicle width direction) to the first upper flap 31.

Thus, in a short length state that the second upper flap 32 is stored to be overlapped with the first upper flap 31 (in FIG. 5, a state shown by a phantom line), the upper flap 22 has a flap length $L_{22A}$ which is substantially the same as in the conventional flap, while in a long length state that the second upper flap 32 is deployed to be shifted from the first upper flap 31 (in FIG. 5, a state shown by a solid line), the upper flap 22 has a flap length $L_{22B}$ which is longer than in the conventional flap.

Figure 5:
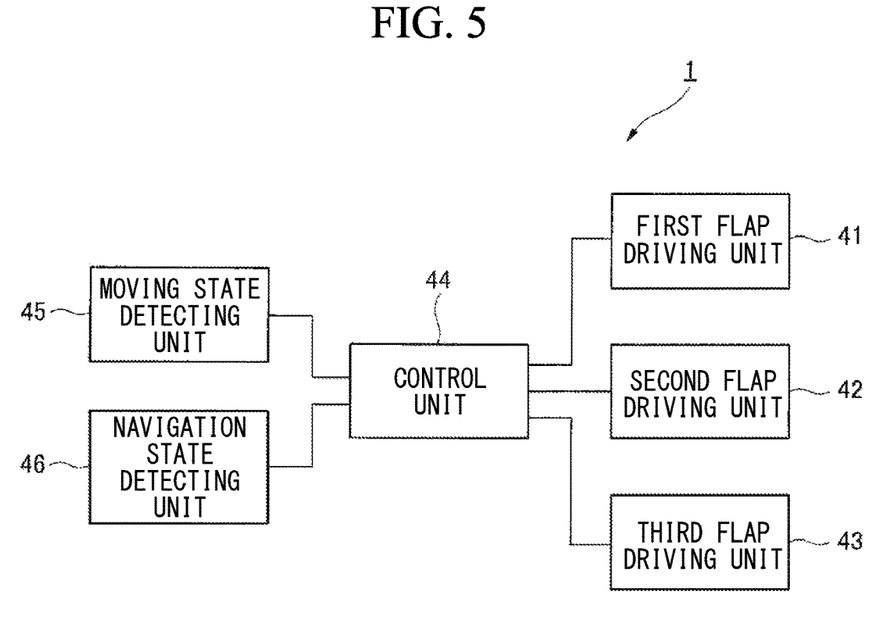
FIG. 5 is a block diagram of a control unit which controls an operation of the flap provided to the amphibious vehicle according to the first example.

As shown in FIG. 5, to the amphibious vehicle 1, a control unit 44 which controls an operation of the flap 13 (deployment and storing) is provided. The control unit 44 is electrically connected to the first flap driving unit 41, the second flap driving unit 42 and the third flap driving unit 43, respectively, and can control the operation of the first flap driving unit 41, the second flap driving unit 42 and the third flap driving unit 43 independently.

Here, as the first flap driving unit 41, the second flap driving unit 42 and the third flap driving unit 43, various driving sources and mechanisms etc. can be adopted. For example, by providing a hydraulic cylinder (an expansion member) as a driving source between members (between the vehicle body 11 and the lower flap 21, between the lower flap 21 and the first upper flap 31, and between the first upper flap 31 and the second upper flap 32), a rotating operation and a sliding operation between the members can be executed using an expanding operation of the hydraulic cylinder. Also, for example, by providing a motor (a power generator) and a gear mechanism (or a wire mechanism) as a driving source between the members (between the vehicle body 11 and the lower flap 21, between the lower flap 21 and the first upper flap 31, and between the first upper flap 31 and the second upper flap 32), the rotating operation and the sliding operation between the members can be executed using a rotating operation of the motor.

Also, as shown in FIG. 5, to the amphibious vehicle 1, a moving state detecting unit 45 which can detect a moving state (water navigation or land driving etc.) of the amphibious vehicle 1 and a navigation state detecting unit 46 which can detect a navigation state of the amphibious vehicle 1 in water navigation are provided. The moving state detecting means 45 and the navigation state detecting unit 46 are electrically connected to the control unit 44, respectively, and the control unit 44 respectively controls driving of the first flap driving unit 41, the second flap driving unit 42 and the third flap driving unit 43 based on a detection result of the moving state detecting 45 and the navigation state detecting unit 46.

Here, as the moving state detecting unit 45 and the navigation state detecting unit 46, various sensors etc. can be adopted. For example, as the moving state detecting unit 45, a switch operated by an occupant and a water pressure sensor which detects that the amphibious vehicle 1 is launched etc. can be adopted, and as the navigation state detecting unit 46, a speed sensor which detects a moving speed in water navigation etc. can be adopted. Additionally, in a case where the speed sensor is adopted as the navigation state detecting unit 46, the control unit 44 determines that the amphibious vehicle 1 is in a floating state when a moving speed of the amphibious vehicle 1 in water navigation is less than a predetermined value, while it determines that the amphibious vehicle 1 is in a sliding state when a moving speed of the amphibious vehicle 1 in water navigation is the predetermined value or more.

An operation of the amphibious vehicle according to the first example of the present invention will be explained with reference to FIGS. 1 to 5.

First, when the amphibious vehicle 1 drives the wheel 12 by the not shown driving source and moves on land, the flap 13 is in a completely stored state (see FIG. 1.)

The flap 13 in the completely stored state is in a state that the lower flap 21 is stored to come close to the front surface 11*a* of the vehicle body 11 and the upper flap 22 is stored to come close to the upper surface 11*b* of the vehicle body 11 in the short length state.

Following this, for example, when the amphibious vehicle 1 is launched and navigates water by driving the not shown propeller by the not shown driving source, the moving state detecting unit 45 detects that a moving state of the amphibious vehicle 1 is moved from a land driving state to a water navigation state (see FIGS. 2 and 5.)

Also, immediately after the amphibious vehicle 1 is moved from the land driving state to the water navigation state, the amphibious vehicle 1 is in a floating state with a deep draft, so that the navigation state detecting unit 46 detects that a navigation state of the amphibious vehicle 1 is the floating state.

Thus, the control unit 44 respectively drives the first flap driving unit 41, the second flap driving unit 42 and the third flap driving unit 43 based on a detection result of the moving state detecting unit 45 and the navigation state detecting unit 46, and transforms the flap 13 from the completely stored state to a completely deployed state.

The flap 13 in the completely deployed state is in a state that the lower flap 21 is deployed to be separated from the front surface 11*a* of the vehicle body 11 and the upper flap 22 is deployed to be separated from the upper surface 11*b* of the vehicle body 11 in the long length state.

In other words, when the amphibious vehicle 1 is moved from the land driving state to the water navigation state (the floating state), the lower flap 21 is deployed to be separated from the front surface 11*a* of the vehicle body 11 by the first flap driving unit 41 and the first upper flap 31 is deployed to be separated from the upper surface 11*b* of the vehicle body 11 by the second flap driving unit 42, and the second upper flap 32 is deployed to be shifted from the first upper flap 31 by the third flap driving unit 43.

Figure 3:
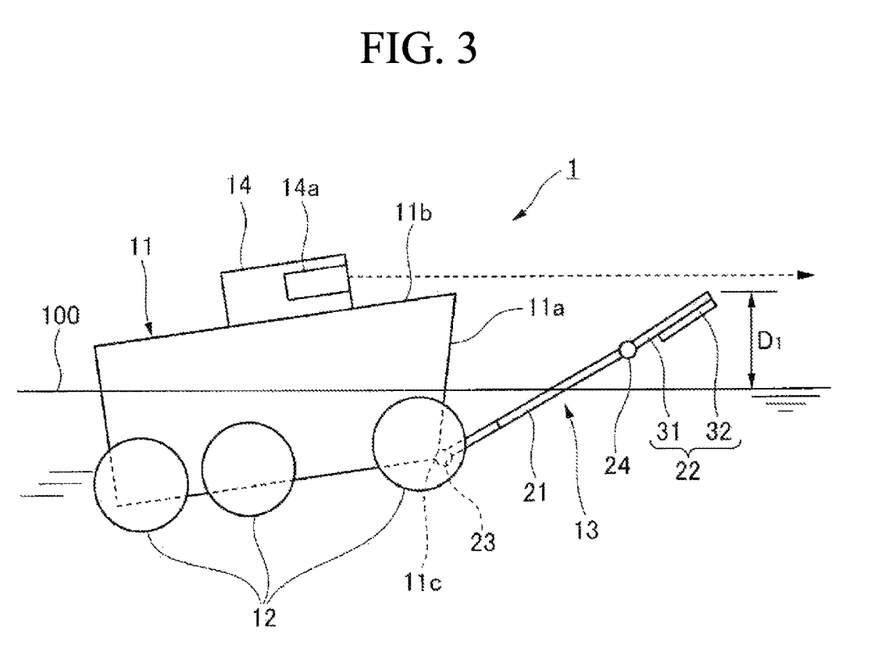
FIG. 3 is an explanation view showing a structure of the amphibious vehicle (a sliding state in water navigation) according to the first example.

Following this, when the amphibious vehicle 1 increases speed in water navigation and is moved from the floating state to the sliding state, the navigation state detecting unit 46 detects that the navigation state of the amphibious vehicle 1 is moved from the floating state to the sliding state (see FIGS. 3 and 5.)

Thus, the control unit 44 drives only the third flap driving unit 43 based on a detection result of the navigation state detecting unit 46 and transforms the flap 13 from the completely deployed state to a partially deployed state (a partially stored state.)

The flap 13 in the partially deployed state (the partially stored state) is in a state that the lower flap 21 is deployed to be separated from the front surface 11*a* of the vehicle body 11 and the upper flap 22 is deployed to be separated from the upper surface 11*b* of the vehicle body 11 in the short length state.

In other words, when the amphibious vehicle 1 is moved from the floating state to the sliding state in the water navigation state, in a state that the lower flap 21 and the first upper flap 31 are remained as deployed, the second upper flap 32 is stored to be overlapped with the first upper flap 31 by the third flap driving unit 43.

Following this, when the amphibious vehicle 1 decreases speed in water navigation and is moved from the sliding state to the floating state, the navigation state detecting unit 46 detects that the navigation state of the amphibious vehicle 1 is moved from the sliding state to the floating state (see FIGS. 2 and 5.)

Thus, the control unit 44 drives only the third flap driving unit 43 based on a detection result of the navigation state detecting unit 46 and transforms the flap 13 from the partially deployed state (the partially stored state) to the completely deployed state.

In other words, when the amphibious vehicle 1 is moved from the sliding state to the floating state in the water navigation state, in a state that the lower flap 21 and the first upper flap 31 are remained as deployed, the second upper flap 32 is stored to be shifted from the first upper flap 31 by the third flap driving unit 43.

Following this, for example, when the amphibious vehicle 1 makes a landing and drives the wheel 12 by the not shown driving source to move on land, the moving state detecting unit 45 detects that the moving state of the amphibious vehicle 1 is moved from the water navigation state to the land driving state (see FIGS. 1 and 5.)

Thus, the control unit 44 respectively drives the first flap driving unit 41, the second flap driving unit 42 and the third flap driving unit 43 based on a detection result of the moving state detecting unit 45, and transforms the flap 13 from the completely deployed state to the completely stored state.

In other words, when the amphibious vehicle 1 is moved from the water navigation state (the floating state) to the land driving state, the second upper flap 32 is stored to be overlapped with the first upper flap 31 by the third flap driving unit 43, and the lower flap 21 is stored to come close to the front surface 11*a* of the vehicle body 11 by the first flap driving unit 41 and the first upper flap 31 (the upper flap 22) is stored to come close to the upper surface 11*b* of the vehicle body 11 by the second flap driving unit 42.

According to the amphibious vehicle 1 according to this example, since the upper flap 22 (the flap 13) is configured such that its flap length is variable, the flap length $L_{22B}$ of the upper flap 22 in the long length state can be set to be longer than that of the conventional flap, and the flap length $L_{13}$ of the flap 13 in the completely deployed state can be set to be longer than that of the conventional flap (see FIG. 4.) In this way, by providing the flap 13 which is longer than the conventional flap, the amphibious vehicle 1 receives lift from water more easily than the conventional flap in water navigation, which achieves moving from the floating state to the sliding state more effectively than the conventional amphibious vehicle and rapid movement to a destination.

Also, according to the amphibious vehicle 1 according to this example, since the large flap 13 is provided, a contact angle $\theta_1$ of the flap 13 with a water surface (a draft line) 100 can be set to be smaller than the conventional contact angle (see FIG. 2.) In this way, by setting the contact angle $\theta_1$ of the flap 13 with the water surface (the draft line) 100 to be smaller, the amphibious vehicle 1 can navigate with reduced water resistance than the conventional amphibious vehicle in water navigation, which achieves moving from the floating state to the sliding state more effectively than the conventional amphibious vehicle and rapid movement to the destination.

Moreover, according to the amphibious vehicle 1 according to this example, since the upper flap 22 is configured such that its flap length is variable, the flap length $L_{22A}$ of the upper flap 22 in the short length state can be set to be substantially the same as that of the conventional flap (see FIGS. 1 and 4.) In this way, by allowing the upper flap 22 in the short length state to have the flap length $L_{22A}$ which is substantially the same as in the conventional flap, the upper flap 22 (the first upper flap 31 and the second upper flap 32) can be stored to come close to the upper surface 11*b* of the vehicle body 11 without interfering with a driver's seat 14 etc. provided to protrude from the upper surface 11*b* of the vehicle body 11 as well as without hindering vision from a wheel window 14*a* of the driver's seat 14.

In addition, according to the amphibious vehicle 1 according to this example, the upper flap 22 in the short length state (the first upper flap 31 and the second upper flap 32) can be stored to come close to the upper surface 11*b* of the vehicle body 11, so that the lower flap 21 can be stored to come close to the front surface 11*a* of the vehicle body 11 (see FIG. 1.) In this way, by storing the lower flap 21 to come close to the front surface 11*a* of the vehicle body 11, the amphibious vehicle 1 can move on land (irregular ground or a stepped portion etc.) without any contact of the flap 13 (the lower flap 21) with the stepped portion etc. in land driving.

Also, according to the amphibious vehicle 1 of this example, since the upper flap 22 (the flap 13) is configured such that its flap length is variable, when the navigation state of the amphibious vehicle 1 is moved to the sliding state, by allowing the upper flap 22 (the flap 13) to be in the short length state, an amount of protrusion $D_1$ of the flap 13 from the water surface (the draft line) 100 can be inhibited (see FIG. 3.) In this way, by inhibiting the amount of protrusion $D_1$ of the flap 13 from the water surface 100 in the sliding state, the amphibious vehicle 1 can navigate with reduced air resistance in water navigation, so that the amphibious vehicle 1 can navigate in the sliding state effectively to move to the destination rapidly.

Moreover, according to the amphibious vehicle 1 of this example, even when a front portion of the vehicle body 11 is inclined upward (an upper side in the vertical direction) in the sliding state, by inhibiting the amount of protrusion $D_1$ of the flap 13 from the water surface 100, vision in a horizontal direction from the wheel window 14*a* of the driver's seat 14 can be well secured (see FIG. 3.)

In this example, the upper flap 22 is schematically constituted by the first upper flap 31 and the second upper flap 32 which are slidable with respect to each other, and is configured such that the flap length of the upper flap 22 (the flap 13) is variable by a sliding operation of the first upper flap 31 and the second upper flap 32. Of course, the present invention is not limited to the configuration of this example.

Figure 6:
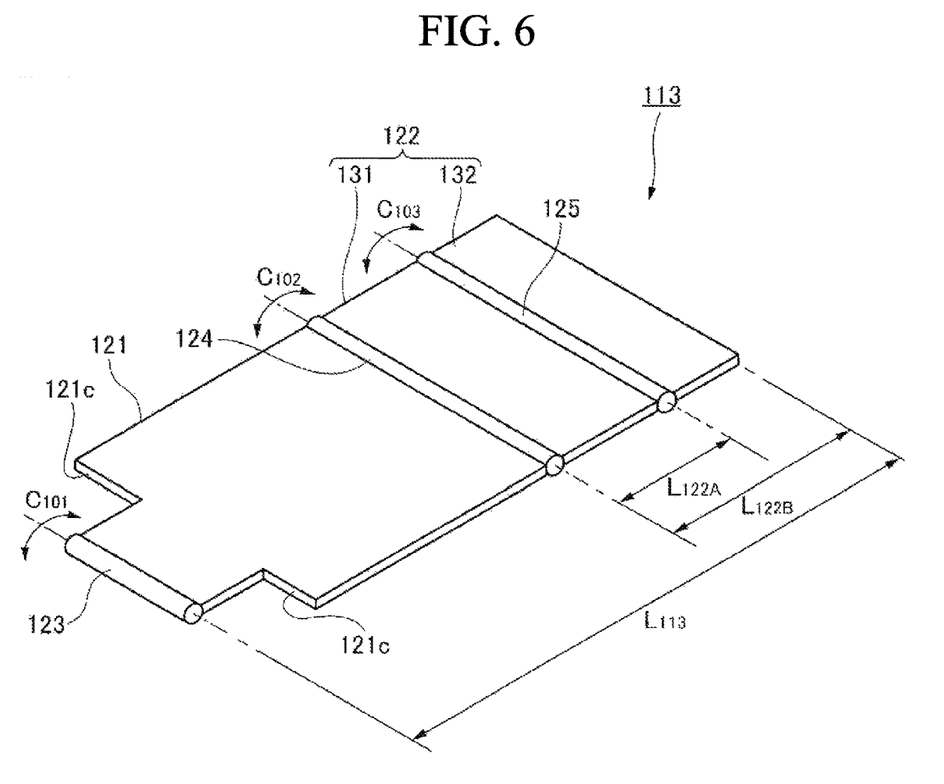
FIG. 6 is an explanation view showing an example in which a structure of the flap provided to the amphibious vehicle according to the first example is changed.

For example, as shown in FIG. 6, an upper flap 122 may be schematically constituted by a first upper flap 131 and a second upper flap 132 which are rotatable with respect to each other, and may be configured such that the flap length of the upper flap 122 (a flap 113) is variable by a rotating operation of the first upper flap 131 and the second upper flap 132 (rotating to fold the second upper flap 132 to the first upper flap 131.) The collapsible flap 113 with such configuration includes a lower flap 121 connected to a vehicle body of a not shown amphibious vehicle rotatably about a rotation axis $C_{101}$ via a hinge 123, the first upper flap 131 connected to the lower flap 121 rotatably about a rotation axis $C_{102}$ via a hinge 124 and the second upper flap 132 connected to the first upper flap 131 rotatable about a rotation axis $C_{103}$ via a hinge 125. Additionally, needless to say, the amphibious vehicle including the collapsible flap 113 with the above configuration provides the same operational effect as in the amphibious vehicle 1 according to the first example.

Also, in this example, to avoid interference of the lower flap 21 (the lower flap 121) with the wheel 12, the lower flap 21 is formed to be substantially T-letter-shaped and a notch 21*c* (a notch 121*c*) is provided to the lower flap 21. Of course, the present invention is not limited to the configuration of this example. For example, the lower flap may be formed as the shape which is similar to a rectangle to the extent that interference with the wheel can be avoided, or such a configuration is accepted that the notch of the lower flap formed to be substantially T-letter-shaped can be closed in water navigation.

Moreover, in this example, when the moving state of the amphibious vehicle 1 is moved to the water navigation state or the land driving state, the moving state detecting unit 45 detects the moving state, and the control unit 44 respectively controls driving of the first flap driving unit 41, the second flap driving unit 42 and the third flap driving unit 43 based on a detection result of the moving state detecting unit 45. Of course, the present invention is not limited to the operation of this example. For example, the control unit may respectively control driving of the first flap driving unit, the second flap driving unit and the third flap driving unit based on an operation of a switch which is a moving state detecting unit, or assuming that the moving state detecting unit can predict transition of the moving state of the amphibious vehicle, the control unit may respectively control driving of the first flap driving unit, the second flap driving unit and the third flap driving unit before the transition (immediately before) of the moving state of the amphibious vehicle. Due to these operations, for example, the amphibious vehicle can store the flap in a state of floating on water.

Second Example

A structure of an amphibious vehicle according to a second example of the present invention will be explained with reference to FIGS. 7 to 11.

The amphibious vehicle according to this example has the same structure as the amphibious vehicle according to the first example of the present invention excluding a configuration of a flap. Accordingly, a duplicated explanation about the same structure as in the first example in the amphibious vehicle according to this example is appropriately omitted.

Figure 7:
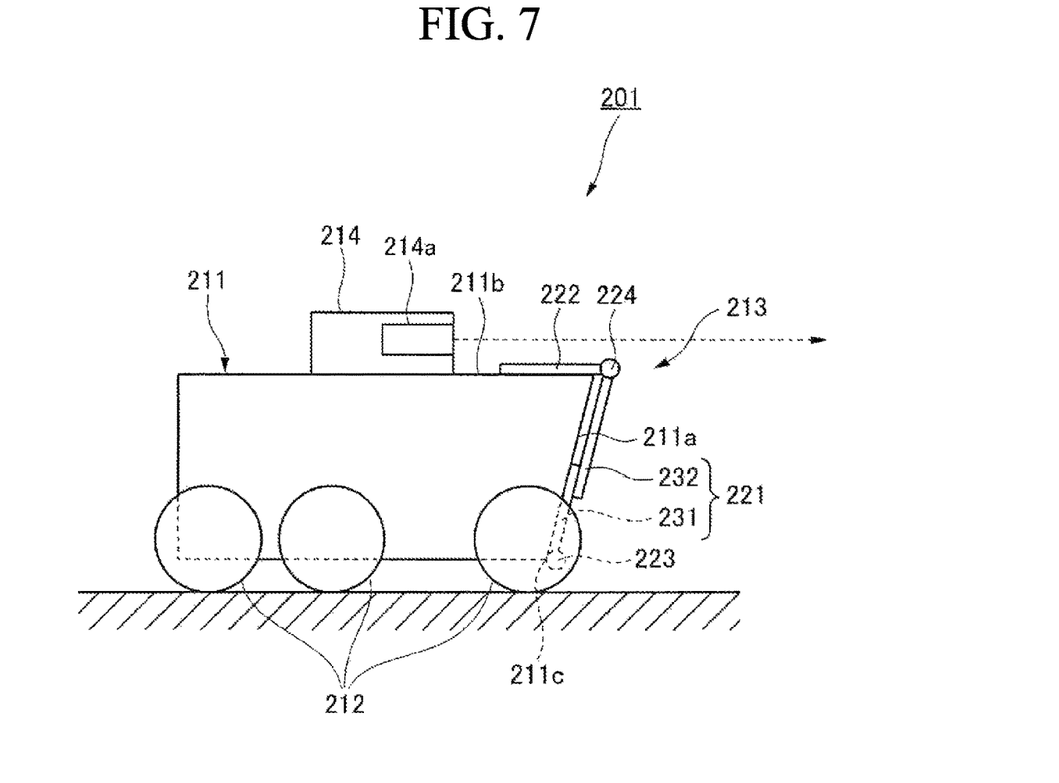
FIG. 7 is an explanation view showing a structure of an amphibious vehicle (in land driving) according to a second example.
Figure 8:
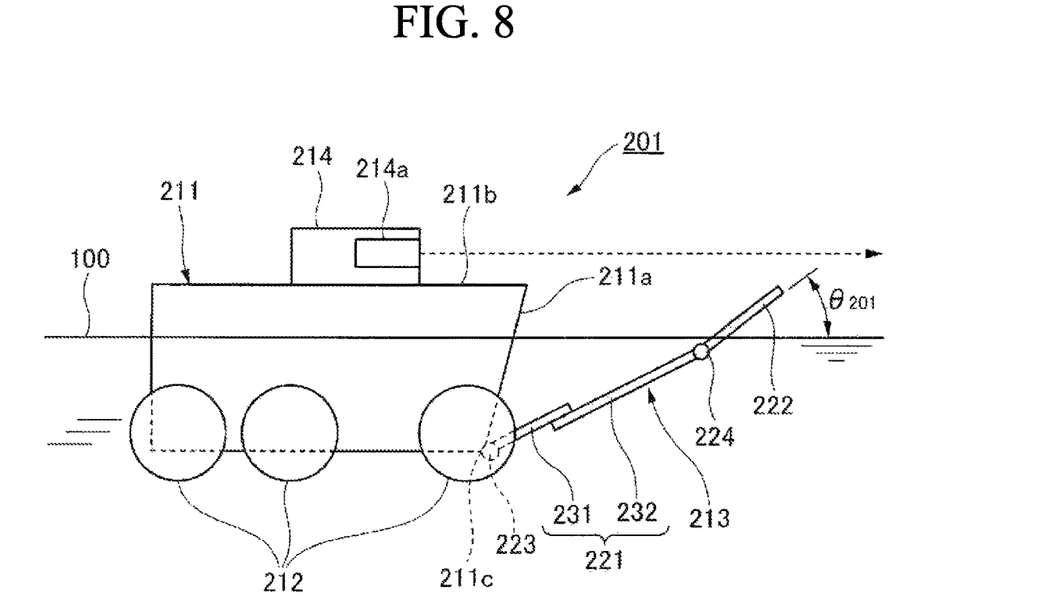
FIG. 8 is an explanation view showing a structure of the amphibious vehicle (a floating state in water navigation) according to the second example.

As shown in FIGS. 7 and 8, to an amphibious vehicle 201, a flap (a plate-like member) 213 for easily receiving lift from water in water navigation is provided. The flap 213 can be deployed and stored to a vehicle body 211 (a collapsible flap), and is schematically constituted by a lower flap 221 to be stored to come close to (come into contact with) a front surface 211a of the vehicle body 211 and an upper flap 222 to be stored to come close to (come into contact with) an upper surface 211b of the vehicle body 211.

Figure 10:
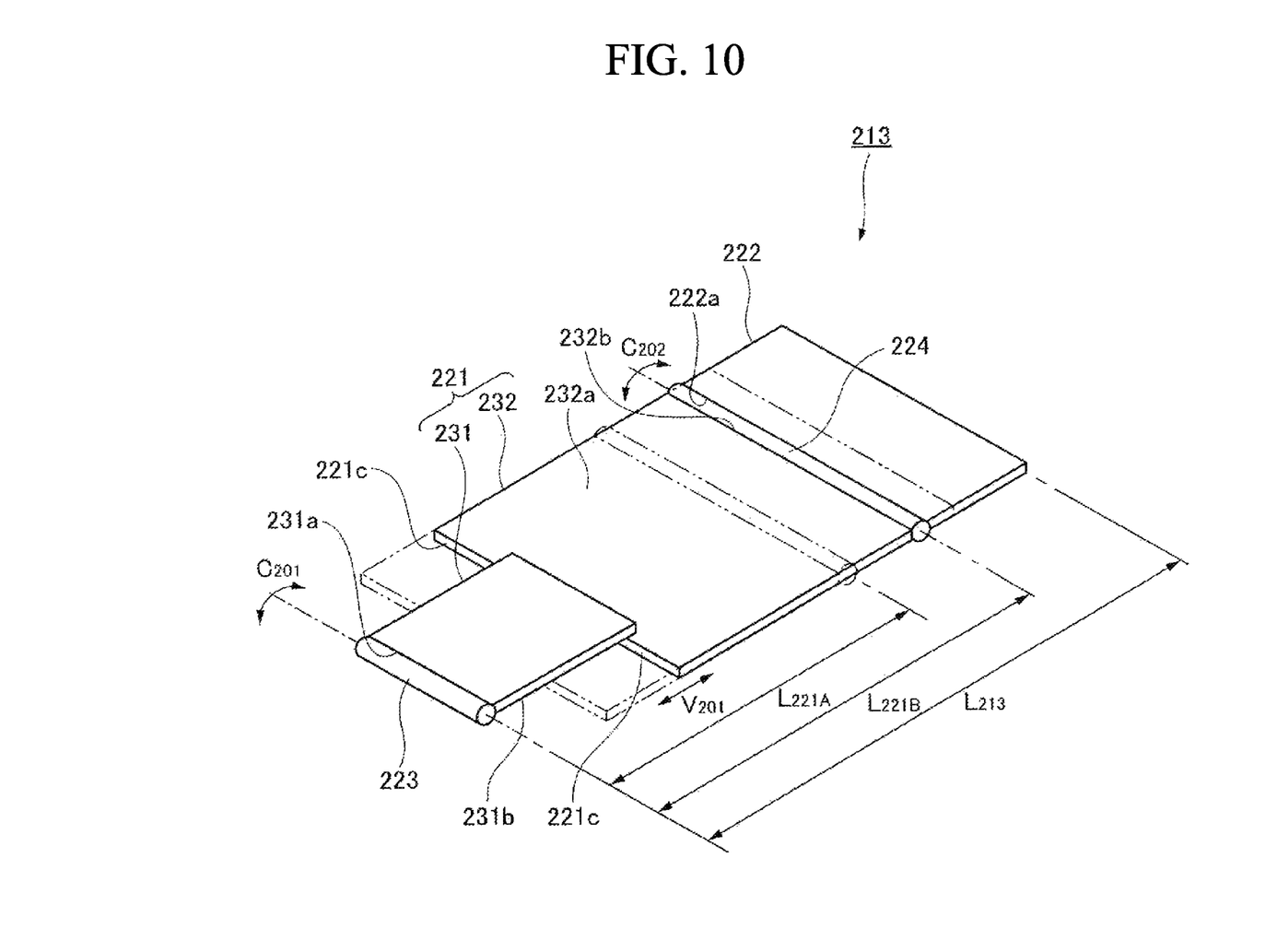
FIG. 10 is an explanation view showing a structure of a flap provided to the amphibious vehicle according to the second example.

As shown in FIGS. 7, 8 and 10, the lower flap 221 is substantially constituted by a first lower flap 231 and a second lower flap 232 which are slidable with respect to each other, and is configured such that a flap length (a length in a direction that the flap (the lower flap 221) extends orthogonally to the vehicle width direction) is variable by a sliding operation of the first lower flap 231 and the second lower flap 232.

The first lower flap 231 is a plate-like member which is substantially rectangular-shaped with a narrow width and whose lower end 231a is connected to a lower end 211c of the vehicle body 211 at a front side in a travel direction via a hinge 223. Also, the first lower flap 231 is mechanically connected to a first flap driving unit 241 (see FIG. 11) for a rotating operation of the first lower flap 231 to the vehicle body 211 to be rotated about a rotation axis $C_{201}$ extending in the vehicle width direction to the vehicle body 211.

The second lower flap 232 is a plate-like member which is substantially rectangular-shaped with a broad width and whose rear surface 232a contacts to a front surface 231b of the first lower flap 231 to be slidably connected to the first lower flap 231. Also, the second lower flap 232 is mechanically connected to a second flap driving unit 242 (see FIG. 11) for a sliding operation of the second lower flap 232 to the first lower flap 231 to be slid in an axial direction V201 (a direction that the lower flap 221 (the first lower flap 231 and the second lower flap 232) extends orthogonally to the vehicle width direction) to the first lower flap 231.

Thus, in a short length state that the second lower flap 232 is stored to be overlapped with the first lower flap 231 (in FIG. 10, a state shown by a phantom line), the lower flap 221 has a flap length $L_{221A}$ which is substantially the same as in the conventional flap, while in a long length state that the second lower flap 232 is deployed to be shifted from the first lower flap 231 (in FIG. 10, a state shown by a solid line), the lower flap 221 has a flap length $L_{221B}$ which is longer than in the conventional flap.

As shown in FIG. 10, the upper flap 222 is a plate-like member which is substantially rectangular-shaped and whose lower end 222a is connected to an upper end 232b of the second lower flap 232 via a hinge 224. Also, the upper flap 222 is mechanically connected to a third flap driving unit 243 (see FIG. 11) for a rotating operation of the upper flap 222 to the second lower flap 232 to be rotated about a rotation axis $C_{202}$ extending in the vehicle width direction to the lower flap 221 (the second lower flap 231.)

Figure 11:
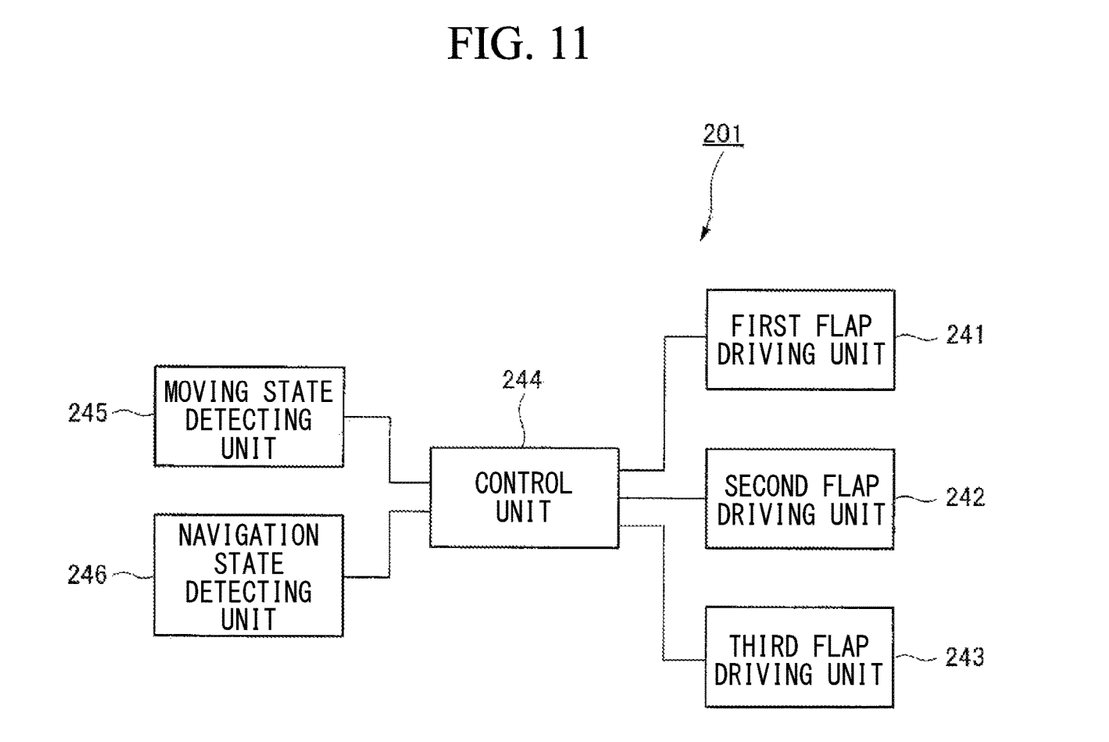
FIG. 11 is a block diagram of a control unit which controls an operation of the flap provided to the amphibious vehicle according to the second example.

As shown in FIG. 11, to the amphibious vehicle 201, a control unit 244 which controls an operation of the flap 213 (deployment and storing) is provided. The control unit 244 is electrically connected to the first flap driving unit 241, the second flap driving unit 242 and the third flap driving unit 243, respectively, and can control the operation of the first flap driving unit 241, the second flap driving unit 242 and the third flap driving unit 243 independently. Here, as the first flap driving unit 241, the second flap driving unit 242 and the third flap driving unit 243, various driving sources and mechanisms etc. can be adopted in the same manner as the first example.

Also, as shown in FIG. 11, to the amphibious vehicle 201, a moving state detecting unit 245 which can detect a moving state (water navigation or land driving etc.) of the amphibious vehicle 201 and a navigation state detecting unit 246 which can detect a navigation state of the amphibious vehicle 201 in water navigation are provided. The moving state detecting means 245 and the navigation state detecting unit 246 are electrically connected to the control unit 244, respectively, and the control unit 244 respectively controls driving of the first flap driving unit 241, the second flap driving unit 242 and the third flap driving unit 243 based on a detection result of the moving state detecting 245 and the navigation state detecting unit 246. Here, as the moving state detecting unit 245 and the navigation state detecting unit 246, various sensors etc. can be adopted in the same manner as the first example.

An operation of the amphibious vehicle according to the second example of the present invention will be explained with reference to FIGS. 7 to 11.

First, when the amphibious vehicle 201 drives a wheel (or a track) 212 by a not shown driving source and moves on land, the flap 213 is in a completely stored state (see FIG. 7.)

The flap 213 in the completely stored state is in a state that the lower flap 221 is stored to come close to the front surface 211a of the vehicle body 211 in the short length state and the upper flap 222 is stored to come close to the upper surface 211b of the vehicle body 211.

Following this, for example, when the amphibious vehicle 201 is launched and navigates water by driving a not shown propeller by a not shown driving source, the moving state detecting unit 245 detects that a moving state of the amphibious vehicle 201 is moved from a land driving state to a water navigation state (see FIGS. 8 and 11.)

Also, immediately after the amphibious vehicle 201 is moved from the land driving state to the water navigation state, the amphibious vehicle 201 is in a floating state with a deep draft, so that the navigation state detecting unit 246 detects that a navigation state of the amphibious vehicle 201 is the floating state.

Thus, the control unit 244 respectively drives the first flap driving unit 241, the second flap driving unit 242 and the third flap driving unit 243 based on a detection result of the moving state detecting unit 245 and the navigation state detecting unit 246, and transforms the flap 213 from the completely stored state to a completely deployed state.

The flap 213 in the completely deployed state is in a state that the lower flap 221 is deployed to be separated from the front surface 211a of the vehicle body 211 in the long length state and the upper flap 222 is deployed to be separated from the upper surface 211b of the vehicle body 11.

In other words, when the amphibious vehicle 201 is moved from the land driving state to the water navigation state (the floating state), the lower flap 221 (the first lower flap 231) is deployed to be separated from the front surface 211a of the vehicle body 211 by the first flap driving unit 241 and the second lower flap 232 is deployed to be shifted from the first lower flap 231 by the second flap driving unit 242, and the upper flap 222 is deployed to be separated from the upper surface 211b of the vehicle body 211 by the third flap driving unit 243.

Figure 9:
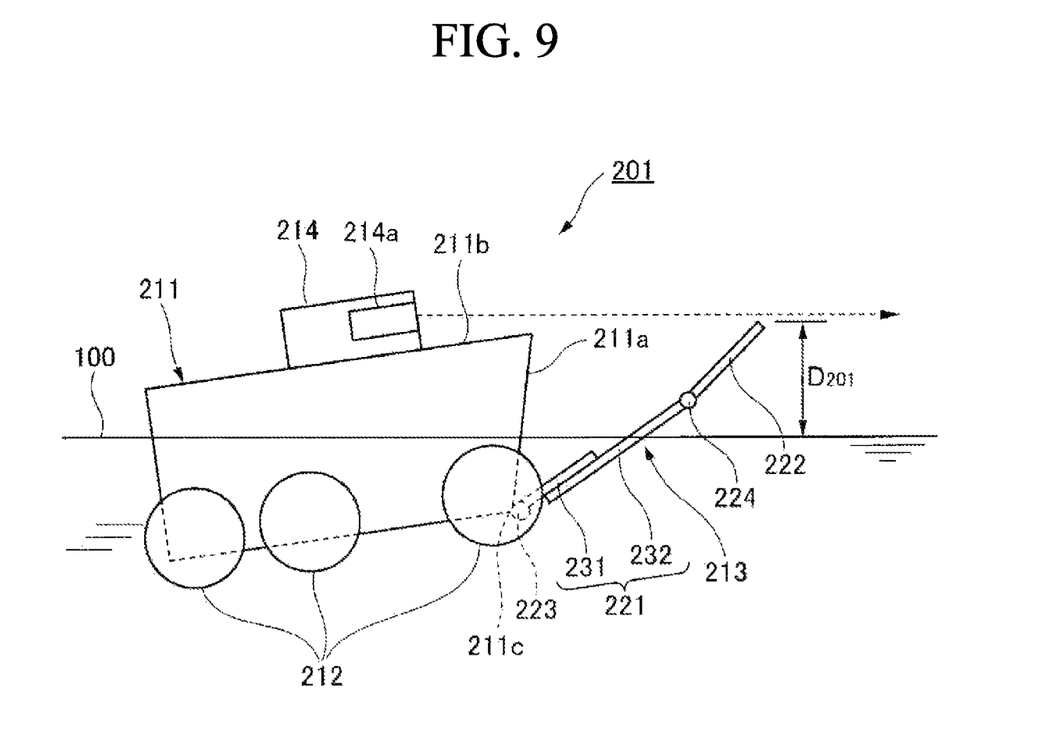
FIG. 9 is an explanation view showing a structure of the amphibious vehicle (a sliding state in water navigation) according to the second example.

Following this, when the amphibious vehicle 201 increases speed in water navigation and is moved from the floating state to the sliding state, the navigation state detecting unit 246 detects that the navigation state of the amphibious vehicle 201 is moved from the floating state to the sliding state (see FIGS. 9 and 11.)

Thus, the control unit 244 drives only the second flap driving unit 242 based on a detection result of the navigation state detecting unit 246 and transforms the flap 213 from the completely deployed state to a partially deployed state (a partially stored state.)

The flap 213 in the partially deployed state (the partially stored state) is in a state that the lower flap 221 is deployed to be separated from the front surface 211a of the vehicle body 211 in the short length state and the upper flap 222 is deployed to be separated from the upper surface 211b of the vehicle body 211.

In other words, when the amphibious vehicle 201 is moved from the floating state to the sliding state in the water navigation state, in a state that the lower flap 221 (the first lower flap 231) and the upper flap 222 are remained as deployed, the second lower flap 232 is stored to be overlapped with the first lower flap 231 by the second flap driving unit 242.

Following this, when the amphibious vehicle 201 decreases speed in water navigation and is moved from the sliding state to the floating state, the navigation state detecting unit 246 detects that the navigation state of the amphibious vehicle 201 is moved from the sliding state to the floating state (see FIGS. 8 and 11.)

Thus, the control unit 244 drives only the second flap driving unit 242 based on a detection result of the navigation state detecting unit 246 and transforms the flap 213 from the partially deployed state (the partially stored state) to the completely deployed state.

In other words, when the amphibious vehicle 201 is moved from the sliding state to the floating state in the water navigation state, in a state that the lower flap 221 (the first lower flap 231) is remained as deployed, the second lower flap 232 is stored to be shifted from the first lower flap 231 by the second flap driving unit 242.

Following this, for example, when the amphibious vehicle 201 makes a landing and drives the wheel 212 by the not shown driving source to move on land, the moving state detecting unit 245 detects that the moving state of the amphibious vehicle 201 is moved from the water navigation state to the land driving state (see FIGS. 7 and 11.)

Thus, the control unit 244 respectively drives the first flap driving unit 241, the second flap driving unit 242 and the third flap driving unit 243 based on a detection result of the moving state detecting unit 245, and transforms the flap 213 from the completely deployed state to the completely stored state.

In other words, when the amphibious vehicle 201 is moved from the water navigation state (the floating state) to the land driving state, the second lower flap 232 is stored to be overlapped with the first lower flap 231 by the second flap driving unit 242, and the lower flap 221 (the first lower flap 231) is stored to come close to the front surface 211a of the vehicle body 211 by the first flap driving unit 241 and the upper flap 222 is stored to come close to the upper surface 211b of the vehicle body 211 by the third flap driving unit 243.

According to the amphibious vehicle 201 according to this example, since the lower flap 221 (the flap 213) is configured such that its flap length is variable, the flap length $L_{221B}$ of the lower flap 221 (the long length state) can be set to be longer than that of the conventional flap, and the flap length $L_{213}$ of the flap 213 (the completely deployed state) can be set to be longer than that of the conventional flap (see FIG. 10.) In this way, by providing the flap 213 which is longer than the conventional flap, the amphibious vehicle 201 receives lift from water more easily than the conventional flap in water navigation, which achieves moving from the floating state to the sliding state more effectively than the conventional amphibious vehicle and rapid movement to a destination.

Also, according to the amphibious vehicle 201 according to this example, since the large flap 213 is provided, a contact angle $\theta_{201}$ of the flap 213 with the water surface (the draft line) 100 can be set to be smaller than the conventional contact angle (see FIG. 8.) In this way, by setting the contact angle $\theta_{201}$ of the flap 213 with the water surface (the draft line) 100 to be smaller, the amphibious vehicle 201 can navigate with reduced water resistance than the conventional amphibious vehicle in water navigation, which achieves moving from the floating state to the sliding state more effectively than the conventional amphibious vehicle and rapid movement to the destination.

Moreover, according to the amphibious vehicle 201 according to this example, since the lower flap 221 is configured such that its flap length is variable, the flap length $L_{221A}$ of the lower flap 221 in the short length state can be set to be substantially the same as that of the conventional flap (see FIGS. 7 and 10.) In this way, by allowing the lower flap 221 in the short length state to have the flap length $L_{221A}$ which is substantially the same as in the conventional flap, the lower flap 221 (the first lower flap 231 and the second lower flap 232) can be stored to come close to the front surface 211a of the vehicle body 211 without hindering vision from a wheel window 214a of a driver's seat 214, and the upper flap 222 can be stored to come close to the upper surface 11b of the vehicle body 11 without hindering vision from the driver's seat 14 (the wheel window 14a.)

In addition, according to the amphibious vehicle 201 according to this example, the lower flap 221 can be stored to come close to the front surface 211a of the vehicle body 211, so that the amphibious vehicle 201 can move on land (irregular ground or a stepped portion etc.) without any contact of the flap 213 (the lower flap 221) with the stepped portion etc. in land driving.

Also, according to the amphibious vehicle 201 of this example, since the lower flap 221 (the flap 213) is configured such that its flap length is variable, when the navigation state of the amphibious vehicle 201 is moved to the sliding state, by allowing the lower flap 221 (the flap 213) to be in the short length state, an amount of protrusion $D_{201}$ of the flap 213 from the air surface (the draft line) 100 can be inhibited (see FIG. 9.) In this way, by inhibiting the amount of protrusion $D_{201}$ of the flap 213 from the water surface 100 in the sliding state, the amphibious vehicle 201 can navigate with reduced water resistance in water navigation, so that the amphibious vehicle 201 can navigate in the sliding state effectively to move to the destination rapidly.

Moreover, according to the amphibious vehicle 201 of this example, even when a front portion of the vehicle body 211 is inclined upward (an upper side in the vertical direction) in the sliding state, by inhibiting the amount of protrusion $D_{201}$ of the flap 213 from the water surface 100, vision in a horizontal direction from the wheel window 214a of the driver's seat 214 can be well secured (see FIG. 9.)

In this example, the lower flap 221 is schematically constituted by the first lower flap 231 and the second lower flap 232 which are slidable with respect to each other, and is configured such that the flap length of the lower flap 221 (the flap 213) is variable by a sliding operation of the first lower flap 231 and the second lower flap 232. Of course, the present invention is not limited to the configuration of this example. For example, the lower flap may be constituted by a plurality of (for example, three) flaps (a plate-like member) which are rotatable with respect to each other, and may be configured such that the flap length of the lower flap (the flap) is variable by a rotating operation of the plurality of flaps.

Also, in this example, to avoid interference of the lower flap 221 with the wheel 212, lengths in the vehicle width direction of the first lower flap 231 and the second lower flap 232 are formed as different, and the lower flap 221 is formed to be substantially T-letter-shaped and a notch 221c is provided to the lower flap 221. Of course, the present invention is not limited to the configuration of this example. For example, the lengths in the vehicle width direction of the first lower flap and the second lower flap may be formed to be substantially the same to the extent that interference with the wheel can be avoided, or such a configuration is accepted that the notch of the lower flap formed to be substantially T-letter-shaped (the lengths in the vehicle width direction are different) can be closed in water navigation.

Moreover, in this example, when the moving state of the amphibious vehicle 201 is moved to the water navigation state or the land driving state, the moving state detecting unit 245 detects the moving state, and the control unit 244 respectively controls driving of the first flap driving unit 241, the second flap driving unit 242 and the third flap driving unit 243 based on a detection result of the moving state detecting unit 245. Of course, the present invention is not limited to the operation of this example. For example, the control unit may respectively control driving of the first flap driving unit, the second flap driving unit and the third flap driving unit based on an operation of a switch which is a moving state detecting unit, or assuming that the moving state detecting unit can predict transition of the moving state of the amphibious vehicle, the control unit may respectively control driving of the first flap driving unit, the second flap driving unit and the third flap driving unit before the transition (immediately before) of the moving state of the amphibious vehicle. Due to these configurations, for example, the amphibious vehicle can store the flap in a state of floating on water.

Also, for example, by combining the first example and the second example, the flap lengths of the lower flap and the upper flap may be configured as variable. Needless to say, the amphibious vehicle including the collapsible flap having such configuration provides the same operational effect as in the amphibious vehicle 1 according to the first example and the second example.

REFERENCE SIGNS LIST

1 Amphibious vehicle
11 Vehicle body
11a Front surface of a vehicle body
11b Upper surface of the vehicle body
11c Lower end at a front side in a travel direction of the vehicle body
12 Wheel
13 Flap
14 Driver's seat
14a Wheel window of the driver's seat
21 Lower flap
21a Lower end of the lower flap
21b Upper end of the lower flap
21c Notch of the lower flap
22 Upper flap
23 First hinge
24 Second hinge
31 First upper flap (first flap member)
31a Lower end of the first upper flap
31b Front surface of the first upper flap
32 Second upper flap (second flap member)
32a Rear surface of the second upper flap
41 First flap driving unit (driving unit)
42 Second flap driving unit (driving unit)
43 Third flap driving unit (driving unit)
44 Control unit
45 Moving state detecting unit
46 Navigation state detecting unit
100 Water surface (draft line)
$D_1$ Amount of protrusion of a flap
$L_{13}$ Flap length of the flap
$L_{22A}$ Flap length of an upper flap (a short length state)
$L_{22B}$ Flap length of the upper flap (a long length state)
$\theta_1$ Contact angle of the flap
201 Amphibious vehicle
211 Vehicle body
211a Front surface of the vehicle body
211b Upper surface of the vehicle body
211c Lower end at the front side in the travel direction of the vehicle body
212 Wheel
213 Flap
214 Driver's seat
214a Wheel window of the driver's seat
221 Lower flap
221c Notch of the lower flap
222 Upper flap
222a Lower end of the upper flap
223 First hinge
224 Second hinge
231 First lower flap (first flap member)
231a Lower end of the first lower flap
231b Front surface of the first lower flap
232 Second lower flap (second flap member)
232a Rear surface of the second lower flap
232b Upper end of the second lower flap
241 First flap driving unit (driving unit)
242 Second flap driving unit (driving unit)
243 Third flap driving unit (driving unit)
244 Control unit

245 Moving state detecting unit
246 Navigation state detecting unit
$D_{201}$ Amount of protrusion of the flap
$L_{213}$ Flap length of the flap
$L_{221A}$ Flap length of the lower flap (a short length state)
$L_{221B}$ Flap length of the lower flap (a long length state)
$\theta_{201}$ Contact angle of the flap

The invention claimed is:

1. An amphibious vehicle in which a flap that receives lift from water in water navigation is provided to be deployable and storable at a front side in a travel direction of a vehicle body, wherein the flap includes a lower flap which is stored to come close to a front surface of the vehicle body and an upper flap which is stored to come close to an upper surface of the vehicle body, at least one of the lower flap and the upper flap includes a first flap member and a second flap member and is configured such that a flap length in a direction orthogonal to a vehicle width direction is variable, the first flap member and the second flap member are connected to be slidable with respect to each other, the flap is configured such that the flap length is variable by a sliding operation of the first flap member and the second flap member, a driving unit which deploys and stores the flap, a navigation state detecting unit which can detect a navigation state in moving on water; and a control unit which controls driving of the driving unit based on a detection result of the navigation state detecting unit, wherein the control unit operates the driving unit such that the flap length is longer when the navigation state detecting unit detects that the navigation state is a floating state, and the control unit operates the driving unit such that the flap length is shorter when the navigation state detecting unit detects that the navigation state is a sliding state.

2. An amphibious vehicle in which a flap that receives lift from water in water navigation is provided to be deployable and storable at a front side in a travel direction of a vehicle body, wherein the flap includes a lower flap which is stored to come close to a front surface of the vehicle body and an upper flap which is stored to come close to an upper surface of the vehicle body, and at least one of the lower flap and the upper flap includes a first flap member and a second flap member and is configured such that a flap length in a direction orthogonal to a vehicle width direction is variable, the amphibious vehicle comprising:

a driving unit which deploys and stores the flap;

a navigation state detecting unit which can detect a navigation state in moving on water; and a control unit which controls driving of the driving unit based on a detection result of the navigation state detecting unit, wherein the control unit operates the driving unit such that the flap length is longer when the navigation state detecting unit detects that the navigation state is a floating state, and the control unit operates the driving unit such that the flap length is shorter when the navigation state detecting unit detects that the navigation state is a sliding state.

* * * * *